(12) United States Patent
Lee et al.

(10) Patent No.: US 8,734,976 B2
(45) Date of Patent: May 27, 2014

(54) BATTERY HAVING ENHANCED ELECTRICAL INSULATION CAPABILITY

(71) Applicant: LG Chem, LTD., Seoul (KR)

(72) Inventors: Jin Soo Lee, Daejeon (KR); Kil Young Lee, Daejeon (KR); Dong-Myung Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/774,250

(22) Filed: Feb. 22, 2013

(65) Prior Publication Data

US 2013/0244071 A1     Sep. 19, 2013

Related U.S. Application Data

(63) Continuation of application No. 12/863,539, filed as application No. PCT/KR2009/000410 on Jan. 28, 2009, now Pat. No. 8,557,423.

(30) Foreign Application Priority Data

Jan. 28, 2008 (KR) ........................ 10-2008-0008381

(51) Int. Cl.
     *H01M 2/02*  (2006.01)
     *H01M 2/16*  (2006.01)
     *H01M 4/02*  (2006.01)
     *H01M 4/13*  (2010.01)
     *H01M 10/04* (2006.01)

(52) U.S. Cl.
     USPC ............. 429/94; 429/164; 429/211; 429/246; 429/247

(58) Field of Classification Search
     CPC .................................................... H01M 10/04
     USPC ........... 429/94, 246, 130, 129, 164, 211, 247; 29/623.1, 623.2
     See application file for complete search history.

(56) References Cited

U.S. PATENT DOCUMENTS 3,298,871 A * 1/1967 Felix Lecouffe Yves et al. ............................... 429/94
4,822,377 A   4/1989 Wolff (Continued)

FOREIGN PATENT DOCUMENTS

EP   1 641 057 A2   9/2005
EP   1 641 057 A3   9/2005

(Continued)

OTHER PUBLICATIONS

English Abstract Only for KR-2003-0042578 (application number for KR-10-0449757-B1, previously filed without an abstract in an IDS dated Jul. 19, 2010).

(Continued)

*Primary Examiner* — Kenneth Douyette
(74) *Attorney, Agent, or Firm* — Birch, Stewart, Kolasch & Birch, LLP

(57) ABSTRACT

Disclosed is a battery including a cathode in which cathode active-material coating layers provided on both surfaces of a cathode collector are longitudinally deviated from each other, and an anode having at least one anode active-material coating layer provided on an anode collector, the cathode and anode being wound to face each other with a separator interposed therebetween. At least one of a winding beginning portion and winding ending portion of the cathode is provided with a cathode uncoated part for installation of a cathode lead. An insulator tape is attached to the boundary of the cathode active-material coating layer at a position where the anode active-material coating layer faces a non-coating part of the cathode not containing the cathode active-material coating layer, achieving enhanced electrical insulation capability and consequential safety of the battery.

15 Claims, 4 Drawing Sheets

(56) References Cited

U.S. PATENT DOCUMENTS

| | | |
|---|---|---|
| 5,958,088 A | 9/1999 | Vu et al. |
| 6,682,853 B2 * | 1/2004 | Kimijima et al. ............. 429/246 |
| 2003/0099880 A1 | 5/2003 | Park et al. |
| 2004/0202928 A1 | 10/2004 | Miyamoto et al. |
| 2005/0277018 A1 | 12/2005 | Kim |
| 2006/0003221 A1 | 1/2006 | Yeo |
| 2006/0216609 A1 | 9/2006 | Abe et al. |
| 2008/0280197 A1 | 11/2008 | Machida |

FOREIGN PATENT DOCUMENTS

| | | |
|---|---|---|
| JP | 2007-325575 A | 12/2007 |
| JP | 2008-277207 A | 11/2008 |
| JP | 2009-64620 A | 3/2009 |
| JP | 2009-134915 A | 6/2009 |
| KR | 20-1999-0034347 U | 8/1999 |
| KR | 10-0449757 B1 | 9/2004 |
| KR | 10-2006-0103188 A | 9/2006 |

OTHER PUBLICATIONS

International Search Report for PCT/KR2009/000410 mailed Mar. 31, 2009.

Machine Translation of: KR 20-1999-0034347U, Hwang, Aug. 25, 1999.

* cited by examiner

BATTERY HAVING ENHANCED ELECTRICAL INSULATION CAPABILITY

CROSS REFERENCE TO RELATED APPLICATIONS

This application is a Continuation of U.S. application Ser. No. 12/863,539 filed on Jul. 19, 2010, now U.S. Pat. No. 8,557,423, which is a National Stage of PCT/KR2009/000410 filed on Jan. 28, 2009, which claims priority to Korean Application No. 10-2008-0008381 filed on Jan. 28, 2008. The entire contents of all of the above applications are hereby incorporated by reference.

TECHNICAL FIELD

The present invention relates to a battery having enhanced electrical insulation capability, and more particularly, to a battery wherein an insulator tape is attached to the boundary of a cathode active-material coating layer at a position where an anode active-material coating layer faces a cathode uncoated part where no cathode active-material coating layer is present, achieving enhanced electrical insulation capability and consequential safety of the battery.

BACKGROUND ART

Conventionally, differently from a primary battery having no charge ability, a rechargeable secondary battery having charge and discharge characteristics is actively under study with the development of advanced technologies including digital cameras, cellular phones, laptop computers, hybrid cars, etc. Examples of the secondary battery include a nickel-cadmium battery, nickel-metal hydride battery, nickel-hydrogen battery, a lithium secondary battery, etc.

Of the above-mentioned secondary batteries, a lithium secondary battery has a driving voltage of 3.6V or more. The lithium secondary battery may be utilized as a power source for portable electronic appliances, or may be utilized in high-power hybrid cars when a plurality of lithium secondary batteries are connected in series. Since the lithium secondary battery has a higher driving voltage three times that of the nickel-cadmium battery or nickel-metal hydride battery and also, has superior energy density per unit weight, the use of the lithium secondary battery is rapidly increasing.

At present, a lithium ion battery has been fabricated, wherein a cathode and an anode, which are insulated by a separator interposed therebetween, are wound into a cylindrical or prismatic electrode assembly, and after the resulting electrode assembly is inserted into a metal can, an electrolyte is injected into the metal can. As the metal can is sealed, the fabrication of the lithium ion battery is completed.

More particularly, a conventional lithium ion battery includes a cathode in which a cathode active-material coating layer is provided on one surface or both surfaces of a cathode collector, and an anode in which an anode active-material coating layer is provided on one surface or both surfaces of an anode collector, the cathode and anode being wound with a plurality of separators interposed therebetween.

In the case where active-material coating layers are provided on both surfaces of an electrode collector, the active-material coating layer provided on one surface of the electrode collector is generally shorter than the active-material coating layer provided on the other surface of the electrode collector. Typically, it is desirable that a length and width of an anode be longer than a length and width of a cathode, to prevent extraction of lithium ions from the cathode.

Recently, a battery has been developed, which is changed in configuration such that active-material coating layers applied to both surfaces of a cathode collector are longitudinally deviated from each other, causing a part of one active-material coating layer so as not to be included in the other active-material coating layer.

FIG. 1 is a sectional view of a conventional battery having the above-described configuration, and FIG. 2 illustrates a "jelly-roll" configuration of the wound battery. Considering the configuration of the conventional battery in detail with reference to the drawings, the battery includes a cathode in which cathode active-material coating layers 20a and 20b are provided on at least one surface of a cathode collector 10, an anode in which anode active-material coating layers 40a and 40b are provided on at least one surface of an anode collector 30, and a plurality of separators 50a and 50b interposed between the cathode and the anode. At least one of a winding beginning portion and winding ending portion of the cathode collector 10 or anode collector 30 contains a cathode uncoated part 10' or anode uncoated part 30' where no electrode active-material coating layer is present. These uncoated parts 10' and 30' are provided with electrode leads 60 and 70 to be connected to exterior terminals. Both the electrode leads, i.e. cathode lead 60 and anode lead 70 are arranged in the same direction.

When the cathode active-material coating layer 20a comes into contact with the anode with the separator interposed therebetween, the cathode active-material coating layer 20a must overlap the facing anode active-material coating layer 40b (in other words, must have a smaller area than that of the anode active-material coating layer 40b), in consideration of a winding deviation and positional change caused upon charge and discharge of the battery. Under this condition, the boundary between the cathode active-material coating layer and the cathode uncoated part 10' comes across the anode active-material coating layer 40b. This causes occurrence of micro-holes or shrinkage and damages to other functions of the facing separator 50, resulting in significant heat emission upon contact between the anode active-material coating layer 40b and the cathode uncoated part 10'.

As shown in FIG. 1, the cathode lead 60 faces the anode uncoated part 30' with the separator 50b interposed therebetween and thus, there is a risk of short circuit between the cathode lead 60 and the anode uncoated part 30' (see region A).

Further, as shown in FIG. 1, since the anode active-material coating layer 40a provided at an upper surface of the anode collector 30 (see region B) faces the boundary of the cathode active-material coating layer 20b (see region C) with the separator 50a interposed therebetween, and the anode active-material coating layer 40b provided at a lower surface of the anode collector 30 faces the boundary of the cathode active-material coating layer 20a (see the region B) with the separator 50b interposed therebetween, there is also a risk of short circuit. Meanwhile, when the anode and cathode active-material coating layer come into contact with each other under the occurrence of short circuit, there exist a negligible short circuit current and heat emission because of a high electric resistance of the cathode active-material coating layer. However, when the anode comes into contact with the cathode uncoated part (i.e. a part of the cathode collector where no cathode active-material coating layer is present), an insufficient electric resistance causes a serious short circuit current and heat emission which act as dangerous factors significantly deteriorating safety of the battery.

To solve the above-described problems, conventionally, a method for providing an insulator in facing region between the cathode uncoated part and the anode has been adopted.

FIG. 3 illustrates a configuration wherein insulators 90a, 90b, 90c and 90d are provided in the conventional battery shown in FIG. 1. Referring to FIG. 3 together with FIGS. 1 and 2, the anode lead 70 is attached to the anode uncoated part 30' of the anode collector 30 where the anode active-material coating layers 40a and 40b are not present, and the anode lead 70 faces the cathode with seven layers of separators 50 interposed therebetween. Provision of the sufficient number of separators 50 eliminates a necessity for an insulator around the anode lead 70 facing the separators 50. Furthermore, a protective tape 80a is provided at an opposite side of the anode lead 70, eliminating a necessity for an insulator.

Note that a distal end of the winding ending portion of the anode faces, in either direction, the cathode with only one layer of the separator interposed therebetween and therefore, an insulator must be provided therebetween.

Also, the cathode lead 60 is attached to one side of the cathode uncoated part 10' in the winding beginning portion of the cathode collector 10 where the cathode active-material coating layers 20a and 20b are not present, and although not shown in the drawing, the cathode lead 60 faces another cathode with four layers of separators 50 interposed therebetween, eliminating a necessity for an insulator. However, the other side of the cathode collector 10 opposite to the cathode lead 60 faces the anode with only one layer of separator 50 interposed therebetween, having a necessity for an insulator.

Note that both a beginning portion and ending portion of the cathode active-material coating layer face the anode with only one layer of the separator interposed therebetween and therefore, it is necessary to provide an insulator therebetween.

DISCLOSURE OF INVENTION

Technical Problem

Therefore, the present invention has been made to solve several problems of a battery having a cathode wherein active-material coating layers applied to both surfaces of a cathode collector are longitudinally deviated from each other, causing a part of one active-material coating layer so as not to be included in the other active-material coating layer, and in particular, to prevent short circuit caused between an electrode uncoated part where no active-material coating layer is present and a facing electrode.

To prevent short circuit between electrodes and consequential deterioration in electrical insulation capability, the present invention proposes that a cathode lead and anode lead are arranged in opposite directions, rather than being arranged in the same direction, and that an insulator tape is additionally attached to the boundary of a cathode active-material coating layer at a position where an anode active-material coating layer faces a cathode uncoated part where no cathode active-material coating layer is present.

Accordingly, it is an object of the present invention to provide a battery having enhanced electrical insulation capability.

Technical Solution

In accordance with the present invention, the above and other objects can be accomplished by the provision of a battery including: a cathode having a cathode active-material coating layer provided on at least one surface of a cathode collector; and an anode having an anode active-material coating layer provided on at least one surface of an anode collector, the cathode and anode being wound to face each other with a separator interposed therebetween, wherein the cathode active-material coating layer applied to the at least one surface of the cathode collector is longitudinally deviated from a cathode active-material coating layer applied to the other surface of the cathode collector such that application beginning and ending portions of both the cathode active-material coating layers are not consistent with each other, and only at least one of a winding beginning portion and winding ending portion of the cathode is provided with a cathode uncoated part for installation of a cathode lead, and wherein an insulator tape is attached to the boundary of the cathode active-material coating layer at a position where the anode active-material coating layer faces a non-coating part of the cathode not containing the cathode active-material coating layer.

Advantageous Effects

In the case of a battery designed such that active-material coating layers applied to both surfaces of a cathode collector are longitudinally deviated from each other, causing a part of one active-material coating layer so as not to be included in the other active-material coating layer, an insulator tape is attached to the boundary of the cathode active-material coating layer at a position where an anode active-material coating layer faces a cathode uncoated part where no cathode active-material coating layer is present, achieving enhanced electrical insulation capability and safety of the battery.

BRIEF DESCRIPTION OF THE DRAWINGS

The above and other objects, features, and other advantages of the present invention will be more clearly understood from the following detailed description taken in conjunction with the accompanying drawings, in which.

BEST MODE FOR CARRYING OUT THE INVENTION

Hereinafter, the present invention will be described in more detail with reference to the accompanying drawings.

Figure 4:
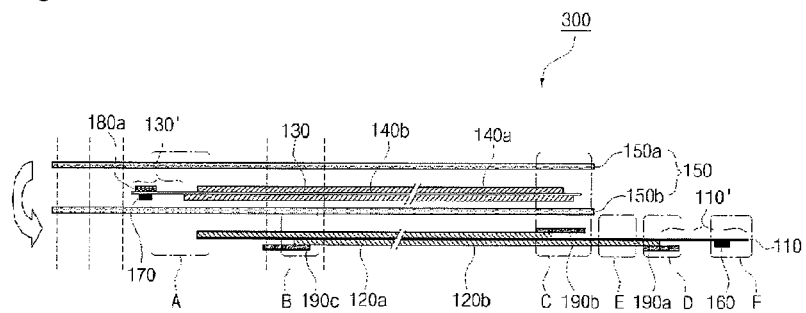
FIG. 4 is a view illustrating a configuration of a battery according to the present invention.

Referring to FIG. 4 illustrating an electrode configuration according to the present invention, an electrode, more particularly, a cathode is configured in such a manner that cathode active-material coating layers 120a and 120b are applied to both upper and lower surfaces of a cathode collector 110, respectively, and the cathode active-material coating layers 120a and 120b are longitudinally deviated from each other, causing a part of one cathode active-material coating layers 120a or 120b so as not to be included in the other cathode active-material coating layer 120b or 120a. In addition, at least one of distal ends of a winding beginning portion and winding ending portion of the cathode collector 110 has no cathode uncoated part (in the drawing, the arrow indicates a winding direction), and only the other end of the cathode collector 110 defines a cathode uncoated part 110' for installation of an electrode lead (i.e. cathode lead) 160 to be connected to an exterior terminal.

In the cathode according to the present invention, since both the cathode active-material coating layers 120a and 120b are longitudinally deviated from each other, with respect to a region where a part of one cathode active-material coating layer is not included in the other cathode active-material coating layer, the cathode active-material coating layer is provided at only one surface of the cathode collector 110, and the other surface of the cathode collector 110 defines a non-coating part containing no cathode active-material coating layer.

The cathode having the above-described configuration is arranged to face an anode with a separator 150 interposed therebetween, and the anode is configured such that anode active-material coating layers 140a and 140b are applied to both upper and lower surfaces of an anode collector 130, respectively. At least one of distal ends of a winding beginning portion and winding ending portion of the anode collector 130 defines an anode uncoated part 130' where the anode active-material coating layers 140a and 140b are not present. An electrode lead (i.e. anode lead) 170 to be connected to an exterior terminal is connected to the anode uncoated part 130'.

In the present invention, the cathode lead 160 and anode lead 170 are arranged in opposite directions, rather than being arranged in the same direction. As known, installation of an electrode lead requires an electron uncoated part where no electrode active-material is coated. Thus, when the cathode lead and anode lead are arranged in the same direction as described with relation to the conventional battery, a cathode uncoated part and anode uncoated part must be arranged in the same direction, causing the above-described several problems including short circuit. To solve these problems, in accordance with the present invention, both the cathode lead and the anode lead are arranged in opposite directions, and at least one side of the cathode is not provided with the cathode uncoated part.

In the present invention, as shown in the several drawings, an ending portion of the separator is positioned to extend lengthwise beyond the winding ending portion of the anode. This arrangement can prevent short circuit between the electrodes even if the separators 150a and 150b undergo heat shrinkage. Preferably, the ending portion of the separator extends from the winding ending portion of the anode by a length of at least 5 mm or more. In addition, a beginning portion of the separator may be wound in a conventional jelly-roll winding manner, but is not particularly limited thereto.

In the above-described configuration of the present invention, with respect to the winding beginning portion of the anode collector 130, the anode active-material coating layer 140a provided at the upper surface of the anode collector 130 comes into indirect contact with the boundary of the cathode active-material coating layer 120b in region B with the separator 150a interposed therebetween. In this case, an insulator tape 190c is attached to the boundary of the cathode active-material coating layer 120b, so as to prevent a non-coating part where the cathode active-material coating layer 120b is not present from coming into contact with the anode active-material coating layer 140a. Also, the anode active-material coating layer 140b provided at the lower surface of the anode collector 130 faces the cathode active-material coating layer 120a in region A with the separator 150b interposed therebetween, rather than coming into indirect contact with a non-coating part where the cathode active-material coating layer 120a is not present.

In addition, with respect to the winding ending portion of the anode collector 130, the anode active-material coating layer 140a provided at the upper surface of the anode collector 130 comes into indirect contact with the boundary of the cathode active-material coating layer 120b in region D with the separator 150a interposed therebetween. In this case, an insulator tape 190a is attached to the boundary of the cathode active-material coating layer 120b, so as to prevent the cathode uncoated part 110' where the cathode active-material coating layers 120a and 120b are not present from coming into contact with the anode active-material coating layer 140a. The anode active-material coating layer 140b provided at the lower surface of the anode collector 130 comes into indirect contact with the boundary of the cathode active-material coating layer 120a in region C with the separator 150b interposed therebetween. An insulator tape 190b is attached to the boundary of the cathode active-material coating layer 120a, preventing the anode active-material coating layer 140b from coming into contact with the cathode uncoated part where the cathode active-material coating layers 120a and 120b are not present.

The insulator tape 190c also serves to come into contact with a cut-face of the anode uncoated part 130' at a tip end of the anode, preventing short circuit that may be caused by sharp burrs present at the cut face of the anode uncoated part 130'. Similarly, the insulator tapes 190a and 190b cover burrs present at a cut-face of the anode uncoated part 130' provided at a distal end of the anode, preventing short circuit with the cathode collector 110.

In the present invention, additionally, an insulator film 180a for insulation of the anode lead 170 is provided at the rear side of the anode lead 170, to face the insulator tape 190c. Accordingly, the insulator film 180a may be omitted for the purpose of designing a battery having a more simplified configuration.

In the present invention, the cathode lead 160 is located at a distal end of the winding ending portion. Upon winding, although a cathode region F containing the cathode lead 160 comes into contact with a cathode region E (more particularly, an upper surface of the region E), contact between these cathode regions reduces a risk of short circuit due to tap edge transfer.

Hereinafter, exemplary embodiments of the present invention will be described in more detail with reference to the accompanying drawings. Of course, it will be appreciated that the present invention is not limited to these embodiments.

Figure 5:
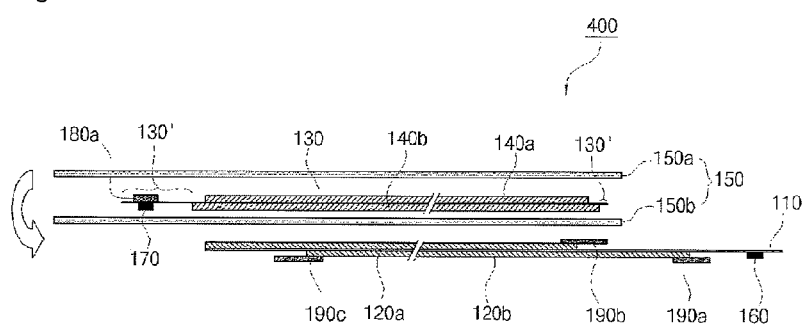
FIGS. 5 and 6 are views illustrating a configuration of a battery and a jelly-roll configuration of the wound battery according to a first embodiment of the present invention.
Figure 6:
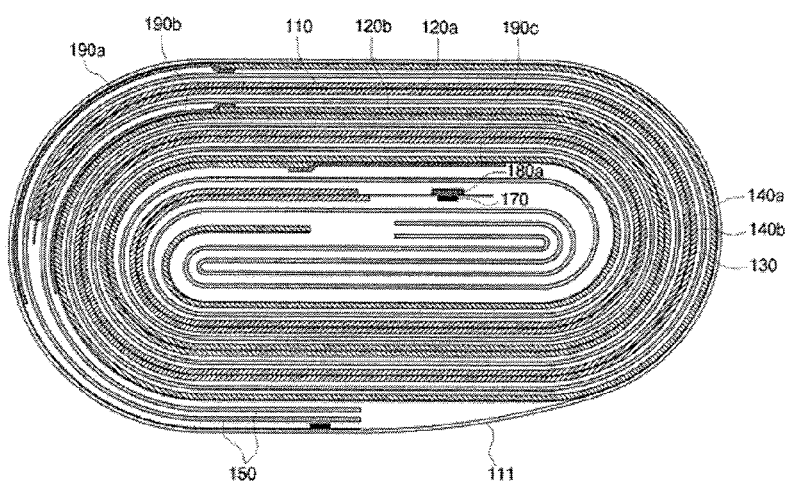

FIGS. 5 and 6 are, respectively, a sectional view of a battery according to a first embodiment of the present invention, and a view illustrating a jelly-roll configuration of the wound battery. Referring to FIGS. 5 and 6, the battery includes a cathode in which cathode active-material coating layers provided at upper and lower surfaces of a cathode collector are longitudinally deviated from each other, causing a part of one cathode active-material coating layer so as not to be included in the other cathode active-material coating layer, an anode in which an anode active-material coating layer provided at one surface of an anode collector has a shorter length than that of an anode active-material coating layer provided at the other surface of the anode collector so as to be entirely included in the other anode active-material coating layer, and a plurality of separators interposed between the cathode and the anode facing each other.

Upon winding, the cathode active-material coating layer in a winding beginning portion of the cathode (i.e. the innermost portion of the jelly-roll configuration) comes into indirect contact with the anode active-material coating layer with the separator interposed therebetween, and a non-coating part of the cathode collector, which is provided at an opposite side of the cathode active-material coating layer and does not contain the cathode active-material coating layer, comes into indirect contact with another non-coating part with at least two layers of separators (in FIG. 6, four layers of separators) interposed therebetween.

Specifically, in the cathode according to the present embodiment wherein the cathode active-material coating layers provided on at least one surface of the cathode collector are longitudinally deviated from each other, with respect to a region where a part of one cathode active-material coating layer is not included in the other cathode active-material coating layer, the cathode active-material coating layer is provided at only one surface of the cathode collector, and the other surface of the cathode collector defines a non-coating part containing no cathode active-material coating layer.

Further, in the present embodiment, the winding beginning portion of the cathode does not contain the cathode uncoated part where both the surfaces of the cathode collector are provided with no cathode active-material coating layer. This configuration may be realized via, for example, a block-cutting method, or a two-step cutting method wherein a cathode collector, which initially defines a cathode uncoated part prior to coating a cathode active-material, is cut once, and after coating the cathode active-material to both surfaces of the cathode collector, the resulting cathode active-material coating layers are cut.

In the above-described first embodiment of the present invention, an insulator tape for prevention of short circuit between electrodes is provided at the boundary of the cathode active-material coating layer, to prevent short circuit between the anode and the non-coating part where the cathode active-material coating layer is provided at only one surface of the cathode collector.

More specifically, the insulator tape 190c is attached to the boundary of the cathode active-material coating layer provided at the lower surface of the cathode collector at a tip end of the cathode, and insulator tapes 190b and 190a are attached to the boundaries of the cathode active-material coating layers 120b and 120a provided at the lower and upper surfaces of the cathode collector in the winding ending portion of the cathode, so as to prevent electrical short circuit between the non-coating part containing no cathode active-material, the anode active-material coating layer and the anode uncoated part. Preferably, the insulator tapes 190a, 190b and 190c are attached to the boundaries of the cathode active-material coating layers during an electrode winding process or during fabrication of a large-width electrode.

As described above, both the cathode lead 160 and the anode lead 170 are arranged in opposite directions, rather than being arranged in the same direction. In particular, the cathode collector 110 is not provided at an opposite side of the cathode lead 160 with the cathode uncoated part, so as to prevent short circuit with the anode.

With respect to the cut face of the anode uncoated part 130' provided at the tip end of the anode, several layers of separators are provided between one side of the cut face and an innermost end of the wound jelly-roll, and the insulator tape 190c is attached to the boundary of the cathode active-material coating layer 120b at the other side of the cut face, achieving enhanced safety against burrs on the cut face. Similarly, the insulator tapes 190a and 190b are attached to the boundaries of the cathode active-material coating layers 120b and 120a with respect to a cut face of the anode uncoated part 130' provided at the winding ending portion of the anode, achieving enhanced safety against burrs on the cut face.

The separators 150 according to the present invention are positioned such that an ending portion of each separator extends lengthwise beyond the distal end of the anode. Accordingly, even if the separators 150a and 150b undergo heat shrinkage, it is possible to prevent short circuit between the electrodes. Preferably, the ending portion of the separator extends from the winding ending portion of the anode by a length of at least 5 mm or more.

Figure 7:
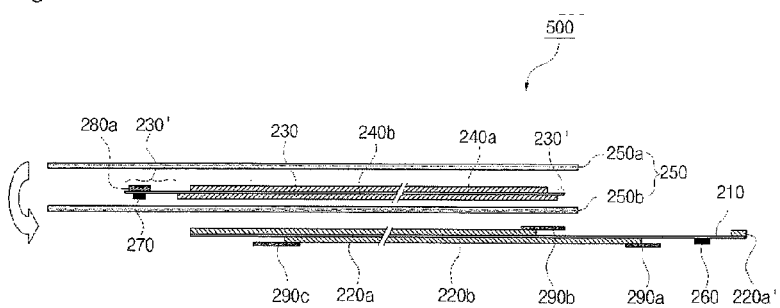
FIGS. 7 and 8 are views illustrating a configuration of a battery and a jelly-roll configuration of the wound battery according to a second embodiment of the present invention.
Figure 8:
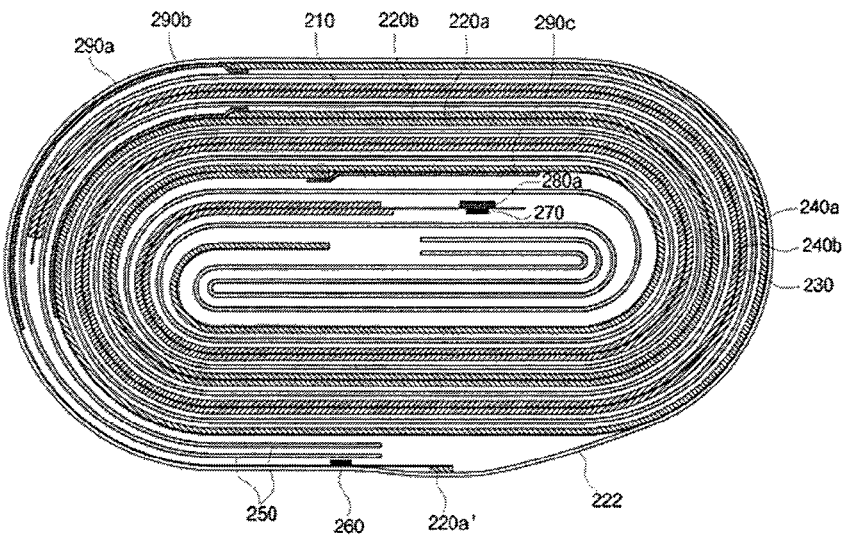

FIGS. 7 and 8 illustrate an exemplary second embodiment of the present invention. As compared to the previously described first embodiment, a cathode active-material coating layer 220a' is further provided at a distal end of a cathode uncoated part at which a cathode lead 260 is installed. With addition of the cathode active-material coating layer 220a' at the distal end of the cathode uncoated part, the second embodiment of the present invention can be realized by a one-step cutting method.

Referring to the above drawings, the battery includes a cathode in which cathode active-material coating layers provided at upper and lower surfaces of a cathode collector are longitudinally deviated from each other, causing a part of one cathode active-material coating layer so as not to be included in the other cathode active-material coating layer, an anode in which an anode active-material coating layer provided at one surface of an anode collector has a shorter length than that of an anode active-material coating layer provided at the other surface of the anode collector so as to be entirely included in the other anode active-material coating layer, and a plurality of separators interposed between the cathode and the anode facing each other.

Upon winding, the cathode active-material coating layer in a winding beginning portion of the cathode comes into indirect contact with the anode active-material coating layer with the separator interposed therebetween, and a non-coating part of the cathode collector, which is provided at an opposite side of the cathode active-material coating layer and does not contain the cathode active-material coating layer, comes into indirect contact with another non-coating part with at least two layers of separators (in FIG. 10, four layers of separators) interposed therebetween.

Specifically, in the cathode according to the present embodiment wherein the cathode active-material coating layers provided on both the surfaces of the cathode collector are longitudinally deviated from each other, with respect to a region where a part of one cathode active-material coating layer is not included in the other cathode active-material coating layer, the cathode active-material coating layer is provided at only one surface of the cathode collector, and the other surface of the cathode collector defines a non-coating part containing no cathode active-material coating layer.

Further, in the present embodiment, the winding beginning portion of the cathode does not contain the cathode uncoated part where both the surfaces of the cathode collector are provided with no cathode active-material coating layer. This configuration may be realized via a one-step cutting method.

Similar to the previously described first embodiment of the present invention, an insulator tape 290c is attached to the boundary of a cathode active-material coating layer 220b provided at a lower surface of a cathode collector 210 at a tip end of the cathode, and insulator tapes 290b and 290a are attached to the boundaries of cathode active-material coating layers 220b and 220a provided at the lower and upper surfaces of the cathode collector 210 in the winding ending portion of the cathode, so as to prevent electrical short circuit between a non-coating part containing no cathode active-material (cathode uncoated part) and the anode. The insulator tapes 290a, 290b and 290c are attached to the boundaries of the cathode active-material coating layers 220a and 220b during an electrode winding process or during fabrication of a large-width electrode.

As described above, both a cathode lead 260 and an anode lead 270 are arranged in opposite directions, rather than being arranged in the same direction. In particular, the cathode collector 210 is not provided at an opposite side of the cathode lead 260 with the cathode uncoated part, so as to prevent short circuit with the anode.

With respect to a cut face of an anode uncoated part 230' provided at a tip end of the anode, several layers of separators are provided between one side of the cut face and an innermost end of the wound jelly-roll, and the insulator tape 290c is attached to the boundary of the cathode active-material coating layer 220b at the other side of the cut face, achieving enhanced safety against burrs on the cut face. Similarly, the insulator tapes 290a and 290b are attached to the boundaries of the cathode active-material coating layers 220b and 220a with respect to a cut face of the anode uncoated part 230' provided at the winding ending portion of the anode, achieving enhanced safety against burrs on the cut face.

The separators 250 according to the present invention are positioned such that an ending portion of each separator extends lengthwise beyond the distal end of the anode. Accordingly, even if the separators 250a and 250b undergo heat shrinkage, it is possible to prevent short circuit between the electrodes. Preferably, the ending portion of the separator extends from the winding ending portion of the anode by a length of at least 5 mm or more.

Figure 9:
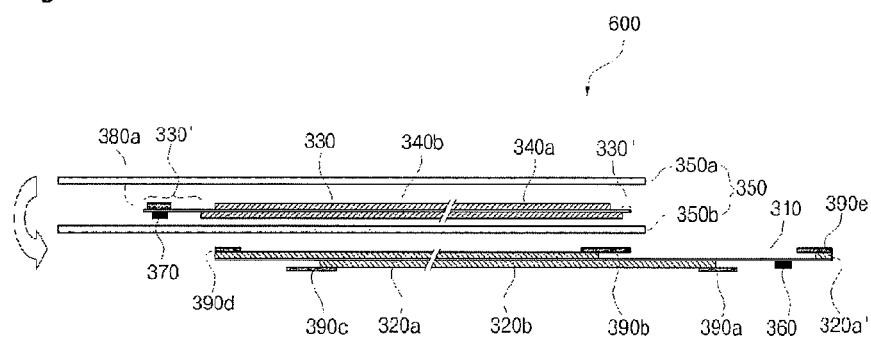
FIGS. 9 and 10 are views illustrating a configuration of a battery and a jelly-roll configuration of the wound battery according to a third embodiment of the present invention.
Figure 10:
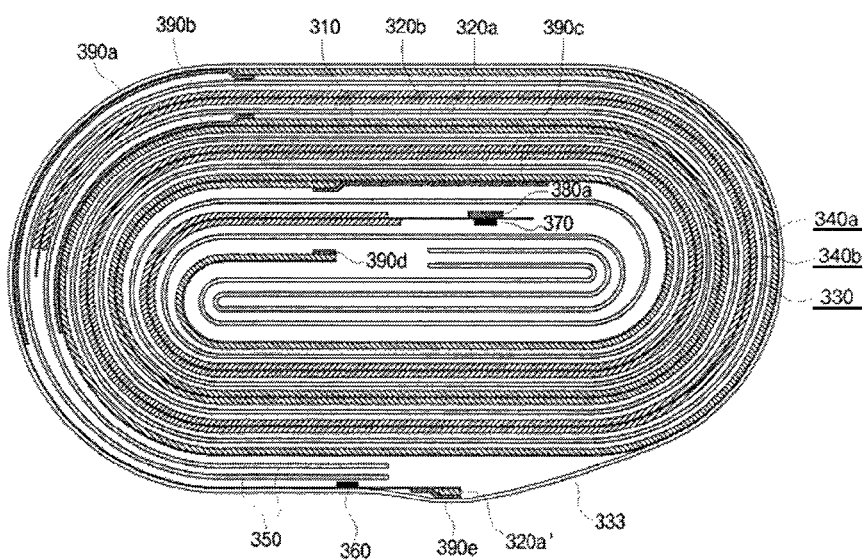

FIGS. 9 and 10 illustrate an exemplary third embodiment of the present invention. As compared to the previously described second embodiment, a cathode active-material coating layer 320a' is further provided in the same manner as the cathode active-material coating layer 220a', and additionally, an insulator tape 390e is provided on the cathode active-material coating layer 320a', and an insulator tape 390d is further provided on a beginning portion of the cathode active-material coating layer at a tip end of a cathode.

The tip end of the cathode according to the present embodiment can be realized by a one-step cutting method, and the additional insulator tape 390d is provided thereon. With provision of the insulator tape 390d at a beginning portion of the cathode active-material coating layer on the tip end of the cathode, it is possible to prevent short circuit between a cathode active-material coating layer 320a and an anode active-material coating layer 340b, which face each other with a separator interposed therebetween.

Explaining the configuration of the battery according to the third embodiment of the present invention in detail, the battery includes a cathode in which cathode active-material coating layers provided at upper and lower surfaces of a cathode collector are longitudinally deviated from each other, causing a part of one cathode active-material coating layer so as not to be included in the other cathode active-material coating layer, an anode in which an anode active-material coating layer provided at one surface of an anode collector has a shorter length than that of an anode active-material coating layer provided at the other surface of the anode collector so as to be entirely included in the other anode active-material coating layer, and a plurality of separators interposed between the cathode and the anode facing each other.

Upon winding, the cathode active-material coating layer in a winding beginning portion of the cathode (i.e. the innermost portion of the jelly-roll configuration) comes into indirect contact with the anode active-material coating layer with the separator interposed therebetween, and a non-coating part of the cathode collector, which is provided at an opposite side of the cathode active-material coating layer and does not contain the cathode active-material coating layer, comes into indirect contact with another non-coating part with at least two layers of separators (in FIG. 10, four layers of separators) interposed therebetween.

Specifically, in the cathode according to the present embodiment wherein the cathode active-material coating layers provided on both the surfaces of the cathode collector are longitudinally deviated from each other, with respect to a region where a part of one cathode active-material coating layer is not included in the other cathode active-material coating layer, the cathode active-material coating layer is provided at only one surface of the cathode collector, and the other surface of the cathode collector defines a non-coating part containing no cathode active-material coating layer.

Insulator tapes 390d and 390c are attached to the boundaries of cathode active-material coating layers provided at upper and lower surfaces of the cathode collector at the tip end of the cathode, and insulator tapes 390b and 390a are attached to the boundaries of the cathode active-material coating layers provided at the upper and lower surfaces of the cathode collector at an ending portion of the cathode, so as to prevent electrical short circuit between the non-coating part not containing the cathode active-material coating layer and an anode active-material coating layer facing each other. The insulator tapes are attached to the boundaries of the cathode active-material coating layers during an electrode winding process, or during fabrication of a large-width electrode.

Both a cathode lead 360 and an anode lead 370 are arranged in opposite directions, rather than being arranged in the same direction. In particular, the cathode collector 310 is not provided at an opposite side of the cathode lead 360 with the cathode uncoated part, so as to prevent short circuit with the anode.

With respect to a cut face of an anode uncoated part 330' provided at a tip end of the anode, several layers of separators are provided between one side of the cut face and an innermost end of the wound jelly-roll, and the insulator tape 390c is attached to the boundary of the cathode active-material coating layer 320b at the other side of the cut face, achieving enhanced safety against burrs on the cut face. Similarly, the insulator tapes 390a and 390b are attached to the boundaries of the cathode active-material coating layers 320b and 320a with respect to a cut face of the anode uncoated part 330' provided at the ending portion of the anode, achieving enhanced safety against burrs on the cut face.

The separators 350 according to the present invention are positioned such that an ending portion of each separator extends lengthwise beyond the distal end of the anode. Accordingly, even if the separators 350a and 350b undergo heat shrinkage, it is possible to prevent short circuit between the electrodes. Preferably, the ending portion of the separator extends from the winding ending portion of the anode by a length of at least 5 mm or more.

Figure 11:
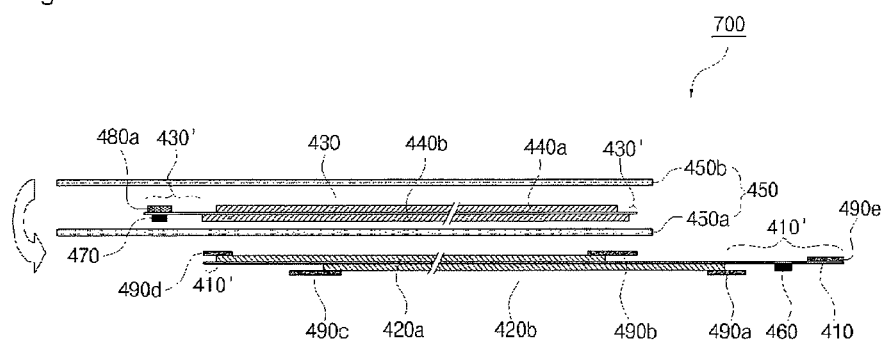
FIGS. 11 and 12 are views illustrating a configuration of a battery and a jelly-roll configuration of the wound battery according to a fourth embodiment of the present invention.
Figure 12:
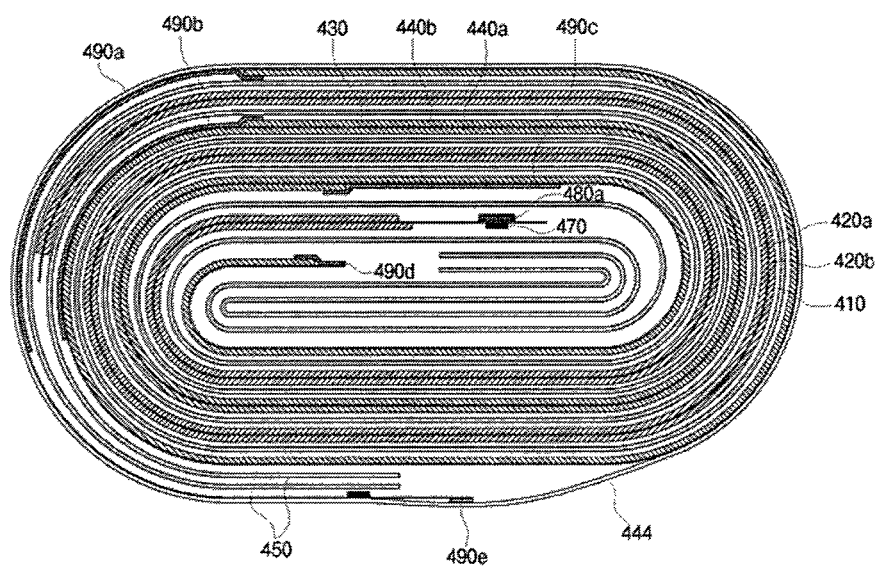

FIGS. 11 and 12 illustrate an exemplary fourth embodiment of the present invention. In the present embodiment, a cathode collector 410 is provided at both distal ends thereof with cathode uncoated parts 410' wherein no cathode active-material coating layer is present. Accordingly, a cathode active-material coating layer begins to extend from a position spaced apart from a winding beginning portion of the cathode by a predetermined distance. The winding beginning portion of the cathode comes into indirect contact with an anode active-material coating layer with a separator interposed therebetween, and a non-coating part of the cathode collector, which is provided at an opposite side of the cathode active-material coating layer and does not contain the cathode active-material coating layer, comes into indirect contact with another non-coating part with at least two layers of separators (in FIG. 12, four layers of separators) interposed therebetween.

The winding beginning portion of the cathode is formed with a cathode uncoated part where no cathode active-material coating layer is present via a one-step cutting method. To prevent electrical short circuit between the non-coating part not containing the cathode active-material coating layer and an anode active-material coating layer facing each other, insulator tapes 490d and 490c are attached to the boundaries of cathode active-material coating layers provided at upper and lower surfaces of the cathode collector at the tip end of the cathode, and insulator tapes 490b and 490a are attached to the boundaries of the cathode active-material coating layers provided at the upper and lower surfaces of the cathode collector at an ending portion of the cathode. Also, an insulator tape 490e is attached to an upper surface of the cathode uncoated part at the distal end of the cathode collector where the cathode lead is located. The insulator tapes 490a, 490b, 490c, 490d and 490e are preferably attached to the boundaries of the cathode active-material coating layers during an electrode winding process, or during fabrication of a large-width electrode.

Both a cathode lead 460 and an anode lead 470 are arranged in opposite directions, rather than being arranged in the same direction. In particular, the cathode collector 410 is not provided at an opposite side of the cathode lead 460 with the cathode uncoated part, so as to prevent short circuit with the anode.

With respect to a cut face of an anode uncoated part 430' provided at a tip end of the anode, several layers of separators are provided between one side of the cut face and an innermost end of the wound jelly-roll, and the insulator tape 490c is attached to the boundary of the cathode active-material coating layer 420b at the other side of the cut face, achieving enhanced safety against burrs on the cut face. Similarly, the insulator tapes 490a and 490b are attached to the boundaries of the cathode active-material coating layer 420b and 420a with respect to a cut face of the anode uncoated part 430' provided at the winding ending portion of the anode, achieving enhanced safety against burrs on the cut face.

The separators 450 according to the present invention are positioned such that an ending portion of each separator extends lengthwise beyond the distal end of the anode. Accordingly, even if the separators 450a and 450b undergo heat shrinkage, it is possible to prevent short circuit between the electrodes. Preferably, the ending portion of the separator extends from the winding ending portion of the anode by a length of at least 5 mm or more.

Although the insulator tapes, used in the respective embodiments of the present invention, are not limited to special insulator tapes so long as they have excellent electrical insulation capability, materials having no heat shrinkage up to 200° C. are preferable. Further, using materials having slight shrinkage under the influence of heat is more preferable to prevent any troubles of a separator interposed between electrodes.

The insulator tapes may be one or more selected from the group consisting of polyimide tapes, acetate tapes, glass-cloth tapes, polyester tapes, polyphenylenesulfide (PPS) tapes and polypropylene tapes, although the present invention is not limited thereto.

Preferably, the insulator tapes provided in the battery according to the present invention have a thickness of 10 μm to 100 μm.

Hereinafter, other constituent elements of the battery according to the present invention will be described, in particular, with respect to a secondary battery.

Preferably, the cathode collector according to the present invention may be made of stainless steel, nickel, aluminum, titanium, or alloys thereof, or may have an aluminum or stainless steel surface treated with carbon, nickel, titanium, or silver. Of these various materials, aluminum or aluminum alloy is preferable.

Specific examples of a cathode active-material according to the present invention may include, but are not limited to; lamellar compounds such as lithium cobalt oxide ($LiCoO_2$), lithium nickel oxide ($LiNiO_2$), etc., or compounds substituted by one or more transition metals; lithium manganese oxide represented by chemical formula $Li_{i+x}Mn_{2-x}O_4$ (where, x is a value of 0~0.33), such as $LiMnO_3$, $LiMn_2O_3$, $LiMnO_2$, etc.; lithium copper oxide ($Li_2CuO_2$); $LiFe_3O_4$; vanadium oxide, such as $LiV_3O_8$, $V_2O_5$, $Cu_2V_2O_7$, etc.; Ni-site type lithium nickel oxide represented by chemical formula $LiNi_{1-x}MXO_2$ (where, M is Co, Mn, Al, Cu, Fe, Mg, B or Ga, and x is a value of 0.01~0.3); lithium manganese composite oxide represented by chemical formula $LiMn_{2-x}MxO_2$ (where, M is Co, Ni, Fe, Cr, Zn or Ta, and x is a value of 0.01~0.1) or $Li_2Mn_3MO_8$ (where, M is Fe, Co, Ni, Cu or Zn); $LiMn_2O_4$ in which Li in chemical formula is substituted by alkaline earth metal ions; disulfide compounds; $Fe_2(MoO_4)_3$, etc. Preferably, the cathode active-material may be lithium cobalt oxide, lithium manganese oxide, lithium nickel oxide, lithium manganese cobalt nickel oxide, or composites of two or more thereof.

The anode collector according to the present invention may be made of stainless steel, nickel, copper, titanium, or alloys thereof, or may have a copper or stainless steel surface treated with carbon, nickel, titanium, or silver. Of these various materials, aluminum or aluminum alloy is preferable.

Specific examples of an anode active-material according to the present invention may include, but are not limited to; carbon and graphite materials, such as natural graphite, artificial graphite, expanded graphite, carbon fiber, non-graphitizing carbon, carbon black, carbon nano-tubes, fullerenes, activated carbon, etc.; metals capable of being alloyed with lithium, such as Al, Si, Sn, Ag, Bi, Mg, Zn, In, Ge, Pb, Pd, Pt, Ti, etc. and compounds containing these elements; composites of metals and compounds thereof and carbon and graphite materials; lithium-based nitrides, etc. Preferably, the anode active-material may be only one or combinations of two or more selected from the group consisting of crystalline carbon, amorphous carbon, silicon-based active materials, tin-based active materials, and silicon-carbon-based active materials. In addition, a conventional binder, conductor, and additive may be added to the anode, and detailed examples or contents thereof are sufficient if they fulfill conventional levels.

The binder serves to assist coupling between the active material and the conductor as well as coupling between the active material and the collector, and may be added at 1 to 50 weight % based on the total weight of electrode compound mixture. Examples of the binder include polyvinylidenefluoride (PVDF), polyvinylalcohol, carboxymethylcellulose (CMC), starch, hydroxypropylcellulose, regenerated cellulose, polyvinylpyrrolidone, tetrafluoroethylene, polyethelene, polypropylene, ethylene-propylene-diene polymer (EPDM), sulfonized EPDM, styrene-butadiene rubber, fluoro rubber, and various copolymers thereof.

The conductor is a component to further improve conductivity of an electrode active material, and may be added at 1 to 20 weight % based on the total weight of electrode compound mixture. The conductor may be selected, without particular limitation, from materials, which have a desired conductivity and do not cause any chemical variation in the battery. Examples of the conductor may include graphite, such as natural graphite, artificial graphite, etc.; black matters, such as carbon black, acetylene black, Ketjen black, channel black, perneis black, lamp black, summer black, etc.; conductive fiber, such as carbon fiber, metal fiber, etc.; metal powders, such as fluorocarbon, aluminum, nickel powder, etc.; conductive whisker, such as zinc oxide, potassium titanate, etc.; conductive metal oxide, such as titanium oxide, etc.; polyphenylene derivative, etc.

The additive is selectively used to restrict expansion of the anode. The additive is selected, without particular limitation, from fibrous materials not causing a chemical variation in the battery. Examples of the additive include olefin-based polymers, such as polyethylene, polypropylene, etc.; and other fibrous materials, such as glass fiber, carbon fiber, etc.

The separator, interposed between the cathode and the anode, is an insulating thin-film having a high ion transmissivity and mechanical strength. The separator has pore sizes having a diameter of 0.01 µm to 10 µm, and a thickness of the separator is within a range of 5 µm to 300 µm. For example, the separator may be composed of chemical-resistant and hydrophobic olefin-based polymers, such as polypropylene, etc.; sheets or non-woven fabrics made of glass fiber or polyethylene, etc.; and kraft paper, etc. Representative examples of currently commercially available separators include Celgard series products (Celgard™ 2400 & 2300) by Hoechest Celanese Corp., polypropylene separators by Ube Industries Ltd. or Pall RAI MFG Co., polyethylene-based separators by Tonen or Entek, etc.

As occasion demands, to enhance stability of the battery, a gel polymer electrolyte may be coated over the separator. Representative examples of gel polymers may include polyethyleneoxide, polyvinylidenefluoride, polyacrylonitrile, etc. When a solid electrolyte, such as polymers, etc., is used, the solid electrolyte may also serve as a separator.

The cathode lead and anode lead are attached, in an electrically conductive manner, to the cathode and anode via welding, such as laser welding, ultrasonic welding or resistant welding, or by use of a conductive adhesive. Protective tapes, made of insulating materials, are attached to the electrode leads, to prevent short circuit between the electrodes.

The present invention provides a prismatic battery obtained as the battery having the above-described configuration is received in a prismatic battery can together and then, a non-aqueous electrolyte is added.

The non-aqueous electrolyte contains lithium salt, and consists of a non-aqueous electrolyte solution and lithium salt. The non-aqueous electrolyte is selected from among a non-aqueous electrolyte solution, solid electrolyte, inorganic solid electrolyte, etc.

For example, the non-aqueous electrolyte solution may be an aprotic organic solvent, such as N-methyl-2-pyrollidinon, propylene carbonate, ethylene carbonate, butylene carbonate, dimethyl carbonate, diethyl carbonate, ethylmethyl carbonate, gammabutyro lactone, 1,2-dimethoxy ethane, 1,2-diethoxy ethane, tetrahydroxy franc, 2-methyl tetrahydrofurane, dimethylsulfoxide, 1,3-dioxolene, 4-methyl-1,3-dioxene, diethylether, formamide, dimethylformamide, dioxolene, acetonitrile, nitromethane, methyl formic acid, methyl acetic acid, phosphoric acid triester, trimethoxy methane, dioxolene derivative, sulfolane, methyl sulfolane, 1,3-dimethyl-2-midasolidinone, propylene carbonate derivative, tetrahydrofurane derivative, ethers, methyl propionic acid, ethyl propionic acid, etc.

For example, the organic solid electrolyte may be a polyethylene derivative, polyethylene oxide derivative, polypropylene oxide derivative, phosphoric acid ester polymer, polyagitation lysine, polyester sulfide, polyvinylalcohol, poly fluorovinylidene, polymers containing ionic disintegrators, etc.

The inorganic solid electrolyte, for example, may include Li-based nitrides, such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI-LiOH, $Li_3PO_4$—$Li_2S$—$SiS_2$, etc., halides, sulfates, etc.

The lithium salt is a material sufficiently soluble in the non-aqueous electrolyte and for example, may be LiCl, LiBr, LiI, $LiClO_4$, $LiBF_4$, $LiB_{10}Cl_{10}$, $LiPF_6$, $LiCF_3SO_3$, $LiAsF_6$, $LiSbF_6$, $LiAlCl_4$, $CH_3SO_3Li$, $CF_3SO_3Li$, LiSCN, LiC$(CF_3SO_2)_3$, $(CF_3SO_2)_2NLi$, chloroboranlithium, low-grade aliphatic carbonic acid lithium, 4-phenyl-boric acid lithium, imides, etc.

For the purpose of enhancing charge and discharge characteristics, fire-retardancy, etc., for example, pyridine, triethylphosphite, triethanolamine, cyclic ether, ethylene diamine, n-glyme, hexa phosphoric acid tri amide, nitrobenzene derivative, sulfur, quinone imine colorant, N-substituted oxasolidinone, N,N-substituted imidasolidine, ethylene glycol dialkyl ether, ammonium salt, pyrrole, 2-methoxy ethanol, trichloro aluminum, etc. may be added to the non-aqueous electrolyte. As occasion demands, to endow incombustibility, a halogen containing solvent, such as tetrachlorocarbon, trifluoroethylene, etc., may be added to the non-aqueous electrolyte. Further, to improve high-temperature maintenance characteristics, carbon dioxide gas may be further added to the non-aqueous electrolyte.

Now, the fabrication of the prismatic lithium battery according to the present invention will be described in brief. First, an electrode group having an approximately oval cross section is prepared by winding a cathode and an anode with a separator interposed therebetween, the separator being made of a non-porous polyethylene film having a thickness of 20 µm. The electrode group is received in a prismatic aluminum battery can having the bottom and sidewall. The top of the battery can define an opening and has an approximately square form. Thereafter, an insulator tape to prevent short circuit between a cathode lead or anode lead and the battery can is prepared and additionally, insulator tapes are prepared at respective regions having a risk of short circuit.

In the present invention, when an insulator tape is attached to a non-coating part containing no cathode active-material coating layer which faces an anode active-material coating layer, the insulator tape may be formed via an insulator tape attachment apparatus in a winding process, or may be attached by a length corresponding to a width of an electrode during an electrode coating process. Then, a spherical sealing member in which an anode terminal surrounded by an insulating gasket is centrally provided is disposed in the opening of the battery can, and the anode lead is connected to the anode terminal. The cathode lead is connected to a lower surface of the sealing member. As the sealing member is welded to the periphery of the opening via laser welding, the opening of the battery can is sealed. Thereafter, a non-aqueous electrolyte is injected into the battery can through an injection hole perforated in the sealing member. Finally, as the injection hole is blocked by a plug via welding, the fabrication of the prismatic lithium secondary battery is completed.

Figure 1:
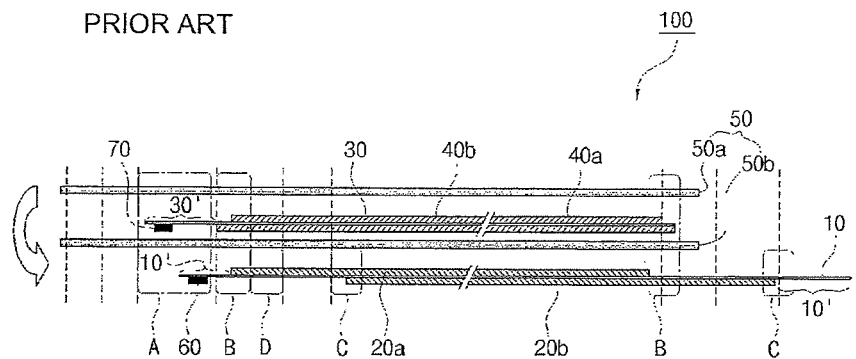
FIG. 1 is a sectional view illustrating a configuration of a conventional battery.
Figure 2:
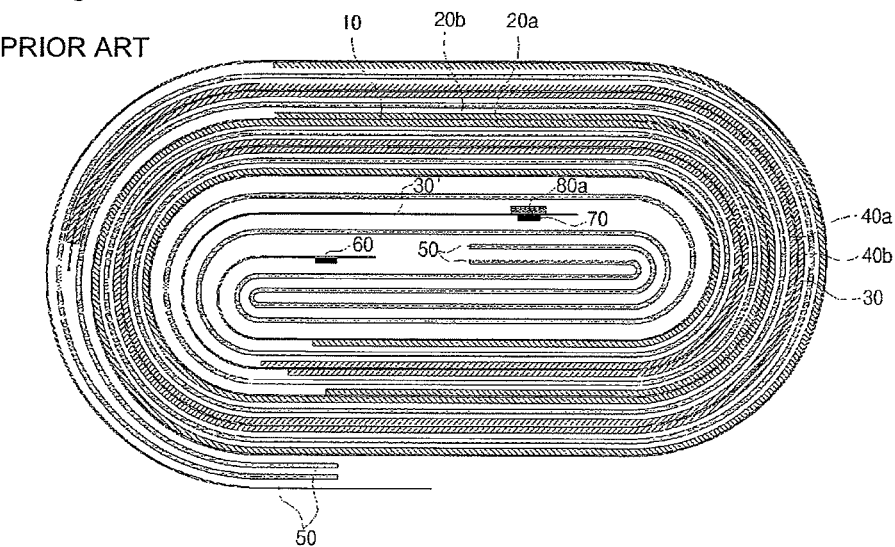
FIG. 2 is a view illustrating a jelly-roll configuration of the wound battery.
Figure 3:
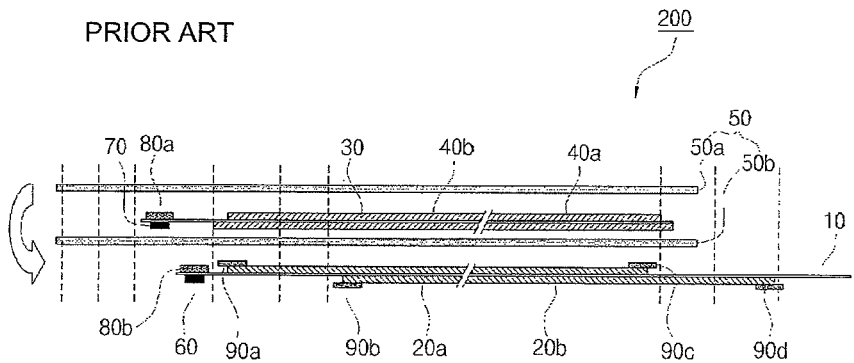
FIG. 3 is a view illustrating a configuration wherein insulators are provided in the battery shown in FIG. 1.

The batteries fabricated according to the first to fourth embodiments as shown in FIGS. 5 and 6, FIGS. 7 and 8, FIGS. 9 and 10 and FIGS. 11 and 12 and the conventional battery as shown in FIG. 1 were subjected to stability estimation via a hot box test, and the results of which are shown in the following Table 1. Here, the hot box test was performed at 150° C. for 1 hour.

TABLE 1

| Prior art | 8/30 ea ignited |
|---|---|
| First Embodiment | 0/30 ea ignited |
| Second Embodiment | 0/30 ea ignited |
| Third Embodiment | 0/30 ea ignited |
| Fourth Embodiment | J/30 ea ignited |

As can be seen from the results of the above Table 1, the prismatic battery fabricated according to the present invention has no risk of internal short circuit under any dangerous environment, achieving considerably enhanced safety of the battery.

Mode for the Invention

Various embodiments have been described in the best mode for carrying out the invention.

INDUSTRIAL APPLICABILITY

The present invention is applicable to a lithium secondary battery for achieving enhanced electrical insulation capability and consequential safety of the battery.

Although the preferred embodiments of the present invention have been disclosed for illustrative purposes, those skilled in the art will appreciate that various modifications, additions and substitutions are possible, without departing from the scope and spirit of the invention as disclosed in the accompanying drawings.

What is claimed:

1. A battery comprising: a cathode having a cathode active-material coating layer provided on at least one surface of a cathode collector; and
    an anode having an anode active-material coating layer provided on at least one surface of an anode collector, the cathode and anode being wound to face each other with a separator interposed therebetween,
    wherein the cathode active-material coating layer applied to the at least one surface of the cathode collector is longitudinally deviated from a cathode active-material coating layer applied to the other surface of the cathode collector such that application beginning and ending portions of both the cathode active-material coating layers are not consistent with each other, only at least one of a winding beginning portion and winding ending portion of the cathode is provided with a cathode uncoated part for installation of a cathode lead, and
    an additional cathode active-material coating layer is provided on at least one surface of a distal end of the cathode uncoated-part, and
    wherein an insulator tape is attached to a boundary of the cathode active-material coating layer at a position where the anode active-material coating layer faces a non-coating part of the cathode not containing the cathode active-material coating layer.

2. The battery according to claim 1, wherein a tip end of the cathode, which corresponds to the application beginning portion of the cathode active-material coating layer provided on the at least one surface of the cathode collector and the application beginning portion of the cathode active-material coating layer provided on the other surface of the cathode collector, is provided on only at least one surface thereof with the cathode active-material coating layer, and is provided on the other surface thereof with a non-coating part not containing the cathode active-material coating layer.

3. The battery according to claim 1, wherein the non-coating part, not containing the cathode active-material coating layer, provided at the tip end of the cathode faces another non-coating part not containing the cathode active-material coating layer with the separator interposed therebetween.

4. The battery according to claim 3, wherein the separator is provided in at least two layers.

5. The battery according to claim 1, wherein, on the basis of the winding beginning portion, the insulator tape is attached to the boundary of the cathode active-material coating layer at both distal ends of a lower surface of the cathode collector and to the boundary of the cathode active-material coating layer at a distal end of an upper surface of the cathode collector.

6. The battery according to claim 1, wherein, on the basis of the winding beginning portion, the insulator tape is attached to the boundary of the cathode active-material coating layer at both distal ends of an upper surface of the cathode collector, to the boundary of the cathode active-material coating layer at both distal ends of a lower surface of the cathode collector, and to the boundary of the cathode active-material coating layer at the distal end of the cathode uncoated-part.

7. The battery according to claim 1, wherein the insulator tape is provided during a winding process or electrode coating process.

8. The battery according to claim 1, wherein the cathode lead and an anode lead of the battery are arranged in opposite directions.

9. The battery according to claim 1, wherein the anode is provided on at least one of a winding beginning portion and winding ending portion thereof with an anode uncoated-part not containing the anode active-material coating layer for connection of an anode lead, and wherein two or more insulator layers are provided on the other surface of the anode collector, to which the anode lead is connected, at a position corresponding to the anode lead.

10. The battery according to claim 1, wherein a cut face of an anode uncoated part provided at a tip end of the anode as a winding beginning portion is insulated and protected by a plurality of separators, and an opposite side of the anode uncoated part is protected by the insulator tape on the boundary of the cathode active-material coating layer, and wherein a cut face of the anode uncoated part at a distal end of the anode as a winding ending portion is protected by the insulator tape on the boundary of the cathode active-material coating layer.

11. The battery according to claim 1, wherein an ending portion of the separator extends beyond a distal end of the anode.

12. The battery according to claim 11, wherein the ending portion of the separator extends from the distal end of the anode by about 5 mm or more.

13. The battery according to claim 1, wherein the insulator tape is one or more selected from the group consisting of a polyimide tape, acetate tape, glass cloth tape, polyester tape, polyphenylenesulfide (PPS) tape, and polypropylene tape.

14. The battery according to claim 1, wherein the insulator tape has a thickness of 10 μm to 100 μm.

15. A prismatic battery wherein the battery according to claim 1 is received in a prismatic battery can, and a non-aqueous electrolyte is further provided.

* * * * *